(No Model.) 10 Sheets—Sheet 1.

G. W. COPELAND & J. E. CRISP.
MACHINE FOR MAKING TACK STRIPS OR NAIL STRIPS.

No. 365,731. Patented June 28, 1887.

Fig. 1.

WITNESSES
J. M. Dolan,
Fred. B. Dolan.

INVENTORS
Geo. W. Copeland
Jno. E. Crisp
by their attys
Clarke & Raymond.

(No Model.) 10 Sheets—Sheet 2.

G. W. COPELAND & J. E. CRISP.
MACHINE FOR MAKING TACK STRIPS OR NAIL STRIPS.

No. 365,731. Patented June 28, 1887.

Fig. 2.

WITNESSES
INVENTORS

(No Model.) 10 Sheets—Sheet 3.

G. W. COPELAND & J. E. CRISP.
MACHINE FOR MAKING TACK STRIPS OR NAIL STRIPS.

No. 365,731. Patented June 28, 1887.

WITNESSES.
INVENTORS.

(No Model.) 10 Sheets—Sheet 5.

G. W. COPELAND & J. E. CRISP.
MACHINE FOR MAKING TACK STRIPS OR NAIL STRIPS.

No. 365,731. Patented June 28, 1887.

WITNESSES.
J. M. Dolan.
Fred. B. Dolan.

INVENTORS.
Geo. W. Copeland
Jos. E. Crisp
by their atty
Clarke & Raymond.

(No Model.) 10 Sheets—Sheet 6.

G. W. COPELAND & J. E. CRISP.
MACHINE FOR MAKING TACK STRIPS OR NAIL STRIPS.

No. 365,731. Patented June 28, 1887.

(No Model.) 10 Sheets—Sheet 7.

G. W. COPELAND & J. E. CRISP.
MACHINE FOR MAKING TACK STRIPS OR NAIL STRIPS.

No. 365,731. Patented June 28, 1887.

WITNESSES
J. M. Dolan.
Fred. B. Dolan.

INVENTORS.
Geo. W. Copeland
Jno. E. Crisp
by their Atty Clarke & Raymond.

(No Model.) 10 Sheets—Sheet 9.

G. W. COPELAND & J. E. CRISP.
MACHINE FOR MAKING TACK STRIPS OR NAIL STRIPS.

No. 365,731. Patented June 28, 1887.

(No Model.) 10 Sheets—Sheet 10.

G. W. COPELAND & J. E. CRISP.
MACHINE FOR MAKING TACK STRIPS OR NAIL STRIPS.

No. 365,731. Patented June 28, 1887.

WITNESSES.
J. M. Dolan.
Fred. B. Dolan.

INVENTORS.
Geo. W. Copeland
Jas. E. Crisp
by their attys
Clark & Raymond.

UNITED STATES PATENT OFFICE.

GEORGE W. COPELAND, OF MALDEN, AND JOSEPH E. CRISP, OF BOSTON, MASSACHUSETTS; SAID CRISP ASSIGNOR TO SAID COPELAND.

MACHINE FOR MAKING TACK-STRIPS OR NAIL-STRIPS.

SPECIFICATION forming part of Letters Patent No. 365,731, dated June 28, 1887.

Application filed October 4, 1886. Serial No. 215,253. (No model.)

*To all whom it may concern:*

Be it known that we, GEORGE W. COPELAND, of Malden, in the county of Middlesex, and JOSEPH E. CRISP, of Boston, in the county of Suffolk, both in the State of Massachusetts, both citizens of the United State, have invented a new and useful Improvement in Tack or Nail Strip Making Machines, of which the following is a full, clear, and exact description, reference being had to the accompanying drawings, forming a part of this specification, in explaining its nature.

The invention comprises the arrangement, in an organized machine, of mechanism or devices for feeding the nail or tack plates or blanks in successive order from a stack or magazine to a second or separate feed mechanism or device, which in turn advances them to punching devices, which form parallel diagonal slots or holes across the plate, and to devices which operate to sever the tack or nail blank or plate into two complete tack or nail strips.

The machine is represented in the drawings as adapted to make the tack-strips described in the Patent No. 343,689, granted to Thomas Barrett, dated June 15, 1886. It also contains some of the features described in the application of Joseph E. Crisp, filed September 1, 1885, Serial No. 175,929.

As organized or embodied in said machine, the invention comprises a magazine arranged to hold a number of tack plates or blanks in stack, the magazine-feed, or mechanism for advancing the blanks or plates in successive order from the machine, and the secondary feed, or devices for advancing the plate or blank to the punching, heading, and severing devices, which two feeds are simultaneously operated from a common actuating device; a spring-presser adapted to bear upon the blank or plate as it enters the feedway of the machine from the magazine to hold and guide it; a reciprocating punch which is operated by a cam and which has a stripping device attached; a blank or plate clamp and a gang of heading-tools upon each side of the feedway, each of which comprises a slitting-tool and spreading-tool and a header attached to a common head, which gangs are provided with simultaneous movements toward and from each other and operated after the plate or block has been clamped; a severing device comprising two gangs of cutters arranged to be moved simultaneously toward and from each other and adapted to sever or separate the headed blank or plate into two complete tack-strips by their successive action, and a device for holding and guiding the two strips as they are moved to the severing mechanism. The plate or blank is prepared for the operation of the machine by having notches or serrations cut in each edge in regular order, to make projections, which are upset to form the heads of the connected tacks, which subsequently compose the two tack-strips.

In the drawings, Fig. 3 is a left-end elevation, the magazine being removed. Fig. 9 shows in perspective the connection between the reciprocating feed-rod and the feeding mechanism for feeding tack strips or blanks from the magazine. Fig. 19 is a view in side elevation thereof.

Before proceeding with the description of the various parts of the machine, we will give a brief statement of its operation, in order that the various devices and the time of their operation and the character of the work which they do may better be understood. The prepared tack or nail blanks or plates are placed in the magazine at the end of the machine. From this they are advanced from the bottom of the stack, in successive order, through a narrow aperture into the feedway of the machine by a feed-roll in the shape of a pinion or gear, which meshes with the serrations upon the edge of the plate or blank. The plate is by this feed, which we have called a "magazine-feed," advanced to a second feed-dog or feed in front of the punching mechanism, which automatically lays hold of the blank or plate, and by a four-motion movement advances it to the punching mechanism, which forms the diagonal slots or holes therein. It is then fed forward from the severing mechanism by the said feed, and by additional feeding devices or dogs, to a position between two clamping-plates, which have vertical movements to and from each other, and two gangs of heading-tools, which have horizontal movements toward and from each other, the combined action of which is to center and hold firmly the plate or blank while the heads are being simultaneously formed upon each edge of the blank. The plate is then advanced to the severing-tools, which are arranged in two gangs, and one of which has a vertical movement and is separated into two complete tack-strips with sharp-pointed prongs or shanks. Of course it will be understood that the tack plate or blank in its movement through the feedway of the machine has an intermittent advancing movement—that is, it is stationary during the operation of the punching, the heading tools and the severing devices, and it is then moved to bring other parts of the plate or blank into position to be operated upon; also, that the movement of the plates or blanks through the machine is continuous, a constant line of blanks or plates being fed forward with this intermittent movement; also, that the operation of the various devices upon the plates or blanks takes place simultaneously—that is, the punching of the slots, clamping and heading, and the severing of the headed blank or plate into tack-strips are simultaneous operations, taking place upon different parts of one or more blanks or plates.

In the drawings, A represents the base or frame of the machine. B B are bearings thereon which carry the main or cam shaft C. This shaft has a fly-wheel, C', fast and loose pulleys $C^6$ $C^7$, and various cams, which will be described in connection with the tools which they operate. As the operation of the machine is continuous, there is no necessity for stop-motion devices.

A bracket or stand, D, fastened to the base A, carries or supports the magazine, hereinafter described, the punch and die for forming the diagonal slots in the blank or plate, and both the magazine-feed and the secondary feed mechanism.

Figures 4, 5:
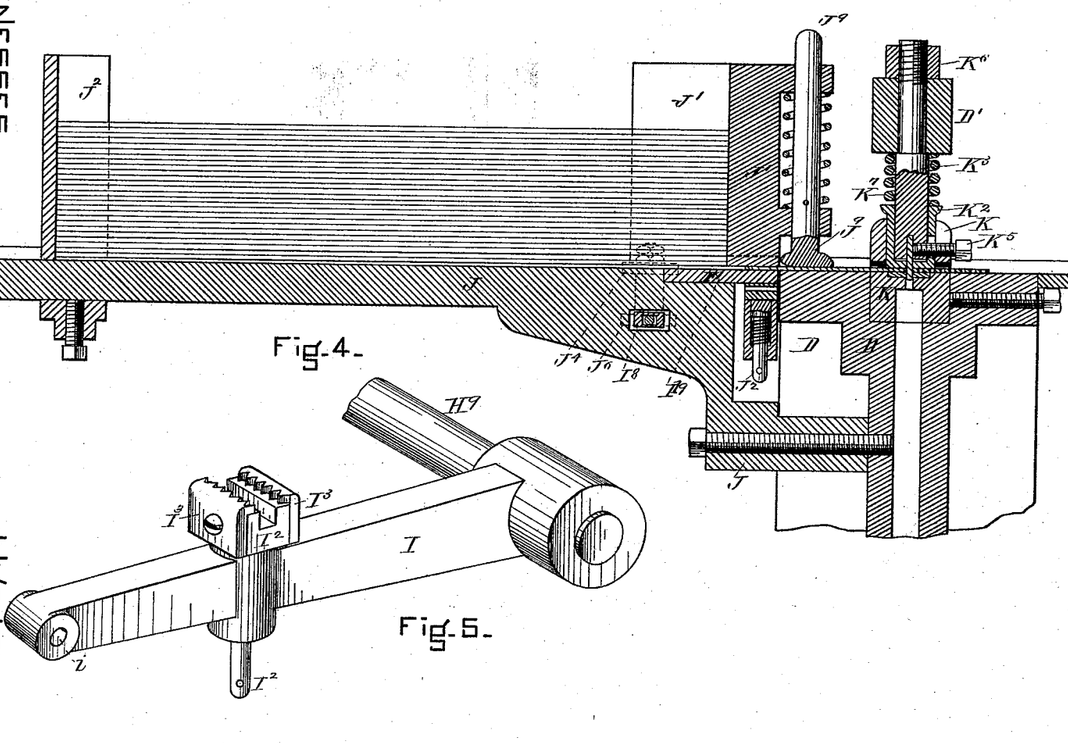
Fig. 4 is a vertical section lengthwise the magazine and parts adjacent thereto, showing a stack of blanks or plates in the magazine.
Fig. 5 is a perspective view of the feed-dog.
Figure 7:
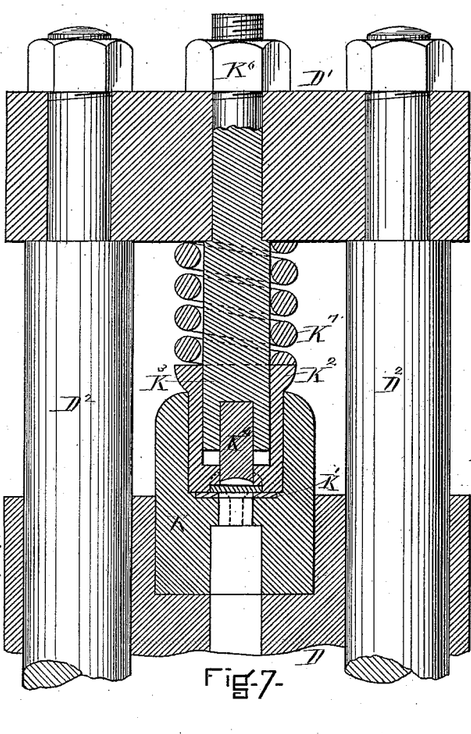
Fig. 7 is a view in vertical section, enlarged, to still further show the construction of the punching devices.
Figures 7, 8, 10:
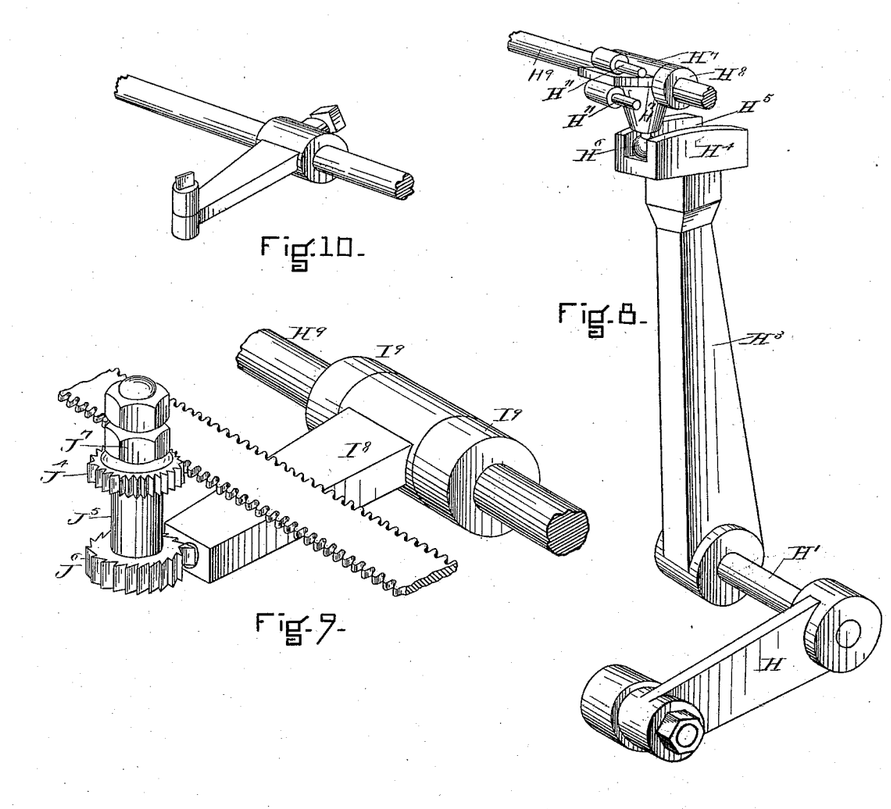
Fig. 8 is a view in perspective of a part of the devices for providing the feed-rod with a reciprocating movement.
Fig. 10 is a view in perspective of one of the feed-dogs adapted to enter the slot in the tack-blank and feed the blank forward.

The die-holder K is well shown in Figs. 4 and 7. It supports the cutting-die K', and is secured in a recess or socket in the stand D by a set-screw, or in any other usual way. The die K' is made of steel or other suitable metal, is quite thin and easily formed in quantities, and is inexpensive.

Above the die-holder K is the punch $K^4$ and presser and stripper $K^2$. The punch $K^4$ is secured to the punch-holder $K^3$ by a set-screw, $K^5$, the body of the set-screw outside of the holder fitting and moving in a slot formed in the presser and stripper $K^2$, so as to permit additional movement of the punch when the stripper and presser is moved upon or brought in contact with the upper surface of the tack-plate or blank to press it against and hold it in the die-plate. We would here say that the tack plate or blank is fed flatwise through the machine, so that the punch is provided with a vertical movement, the heading-tools with horizontal movements, and the severing devices with a vertical movement in relation to it, and that there extends from the magazine through the machine a feedway of proper width to receive and guide the tack plate or blank in its passage. The portion of the set-screw $K^5$ extending from the punch-holder $K^3$ is fitted to and moves in a slot in the die-holder K, so as to always hold the punch at the proper angle to enter the die. The presser and stripper $K^2$ is fitted to the die-holder $K^3$, so as to be movable thereon, and a powerful spring, $K^7$, is arranged above it to bear against the under surface of the cross-head D', which carries or supports the die holder and the upper surface of the presser and stripper $K^2$, to hold the presser or stripper with a strong but yielding pressure, so that in use, when the punch is not in the act of forming a slot in the nail blank or plate, the under or working surface of the presser or stripper extends below the working-surface of the punch and serves to perform two functions—first, upon the downward movement of the cross-head carrying the punch-holder and punch to close upon and come in contact with the upper surface of the tack plate or blank before the punch strikes it, in order that it may be firmly held upon the die-plate before the punch begins operations, and, second, upon the reverse movement of the punch holder or punch it remains stationary upon the tack blank or plate during the first part of the upward movement of the punch, or until the lower surface of the punch has been moved beyond its lower surface, so that it then acts as a holder or stripper in holding the tack plate or blank and stripping it from the punch as the punch moves upwardly.

Figure 6:
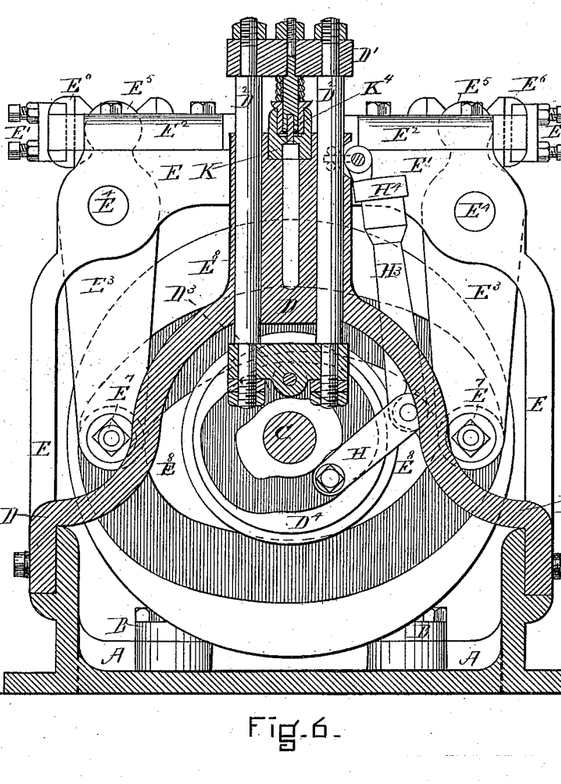
Fig. 6 is a cross vertical section representing particularly the stand carrying the punching mechanism and the cam and connecting devices for operating it.

The cross-head $D'$, supporting or carrying the punch holder, is reciprocated by the cam $D^4$ on the main shaft $C$, the block or connection $D^3$, which has a cam-pin entering a cam-groove in the cam-disk, and the rods or slides $D^2$, connecting the cross-head $D'$ with the said block $D^3$. (See Figs. 4, 6, and 7.)

There is formed in the die-holder $K$ a horizontal hole, preferably in the form of an arch, and which forms a part of the feedway of the machine. This is represeted in Fig. 4.

The cam $D^4$, for operating the punch, and the cam $G^4$, for operating the shears, are the same in construction and time, and have alternate periods of rest and motion, and are adapted to give to their cross-heads two full reciprocations for every complete revolution of the cam-shaft.

The various feeding devices are operated by a common actuating-rod, $H^9$, which extends lengthwise the machine, and has a reciprocating movement in the bearings $H^{10}$ $H^{10}$, and the rod is reciprocated or moved forward by the same cam groove which operates the punch, and it is so connected with said cam that it is operated or moved when the punch is at rest, so that when the punch is in its highest position and at rest the cam serves to move the feed-rod forward, and the feed-rod by its various connections with the tack plates or blanks, hereinafter specified, feeds them. It then comes to rest while the punch descends, and while the punch is stationary at the end of its downward movement the rod is moved back again to again cause the feeding devices to engage the tack blanks or plates, and of course the operation of the heading devices and of the severing mechanism is in unison with the movements of the punch and of the feed. The rod is connected with the cam-groove $D^4$ by means of a cam-pin on the lever $H$, the rocker-shaft $H'$, having the bearing $H^2$, and the lever $H^3$, the lever $H^3$ carrying at its upper end the block $H^4$, which has a cam-groove, $H^5$, in its upper surface, and which is secured to the lever $H^3$ so as to be turned upon a vertical pivot or axis to move its cam-groove $H^5$ into any desired angle or position in relation to the movement or oscillation of the lever $H^3$, and this block is adapted to be fastened in such position to the lever $H^3$ by a set screw. The rod $H^9$ has a connection or arm, $H^7$, secured to it between the collars $H^8$ $H^8$, so that the rod is free to revolve in the arm $H^7$; but any reciprocating movement given to the arm $H^7$ is communicated to the rod $H^9$ by the collars $H^8$ $H^8$. The arm $H^7$ forms the connection between the feed-rod $H^9$ and the block $H^4$, and it has a roll or rounded end, $H^6$, that fits the cam-groove in the block $H^4$, so that upon the oscillating movement of the lever $H^3$ the cam-groove in the block $H^4$ causes the arm $H^7$ to be moved forward and backward, thereby communicating like movements to the rod $H^9$. To steady the arm $H^7$, or to prevent its turning, we have secured thereto a plate which extends horizontally between the pins $H^{11}$ $H^{11}$. Of course the length of the movement or reciprocation of the rod $H^9$ will depend upon the angle to which the cam-groove in the block $H^4$ is set, and by turning it upon its vertical pivot the extent of this movement can be easily varied to any desired degree. It is not only necessary to provide the feed-rod $H^9$ with a reciprocating movement, but it must also have a partial rotation as well. This movement is necessary for the purpose of moving the feed-dogs upward to enter the slots in the plate or blank, and downward to disengage them after they have been moved forward to assist in feeding the blank; and it is provided by the lever $I$, (see Fig. 3,) which is firmly fixed to the feed-rod $H^9$ by the set-screw $I'$, and which extends horizontally therefrom under the feedway, and is adapted to carry the serrated spring or yielding feed dog $I^2$, (see Fig. 5,) which is adapted to engage the head-forming projections on the tack blank or plate and to assist in feeding it, as will hereinafter be explained. This lever $I$ has at its outer end a hole, $i$, which receives the lower end of the strong spring $I^4$, and the upper end of said spring is fixed in one of the slides $D^2$, carrying the punch cross-head $D'$. It follows from this construction that when the cross-head is raised, lifting the punch $K^4$ from a tack plate or blank, it lifts the end of the lever $I$, causing it to partially rotate the rod $H^9$, and moves the dog $I^2$ upward to engage the edges of the tack plate or blank and the other feed-dogs which enter the slots or holes in the tack plate or blank arranged in front of or beyond the punching mechanism and in front of the heading devices; and upon the forward movement of the rod $H^9$ the lever $I$ moves with it, its connection with the spring $I^4$ permitting it to be thus moved. Upon the descent of the cross-head $D'$ and the punch the end of the lever $I$ is moved downward and the rod H⁹ is rotated in an opposite direction, moving the feed-dogs I² downward, and the rod H⁹, lever I, and their connections are then moved backward upon this lower level to their original position. The feed-dog I² has a yielding movement in relation to the lever I. The lever has a hole of sufficient size to receive a spindle extending downward from the dog I² (see Figs. 4 and 5) and a coiled spring which surrounds the spindle and moves the dog upwardly from the lever, a pin in the spindle or other means limiting the extent of this upward movement. It follows from this construction that upon the upward movement of the lever I and of the dog, if the projections upon the tack plate or blank in the feedway above the dog are not in line with the serrations of the feed-dog, the feed-dog will become stationary upon contact with the under surface of the plate, and still permit the continued upward movement of the lever I; but upon a slight horizontal movement of the rod H⁹ the dog is moved sufficiently to bring its projections into line with the notches or serrations of the plate, and the spring then serves to automatically move it upward to engage them. I have represented three feed-dogs which enter the slots in the plate or blank, and they are lettered I⁵ I⁶ I⁷, and are of such length that they enter the slots before the punch and other tools that pass through the blank or plate are fully withdrawn from it, so that after the blank or plate is once engaged by these dogs it is held rigidly in place in the feedway, and to disengage them the spring or connection must be sprung or removed from the end of the lever I when the cross-head D′ is in its highest position, and the feed-dogs can then be moved by turning the rod H⁹ to disengage them from the slots of the plate or blank.

Figure 1:
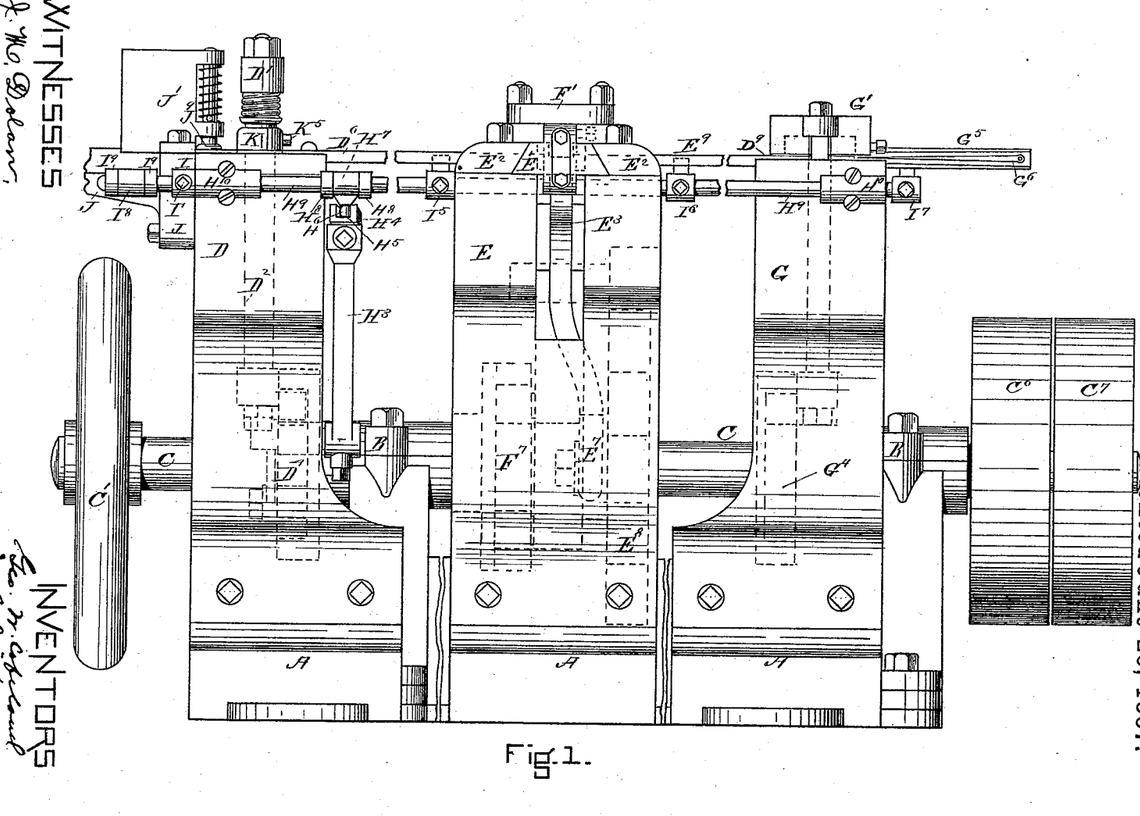
Figure 1 is a side elevation of our improved machine.
Figure 2:
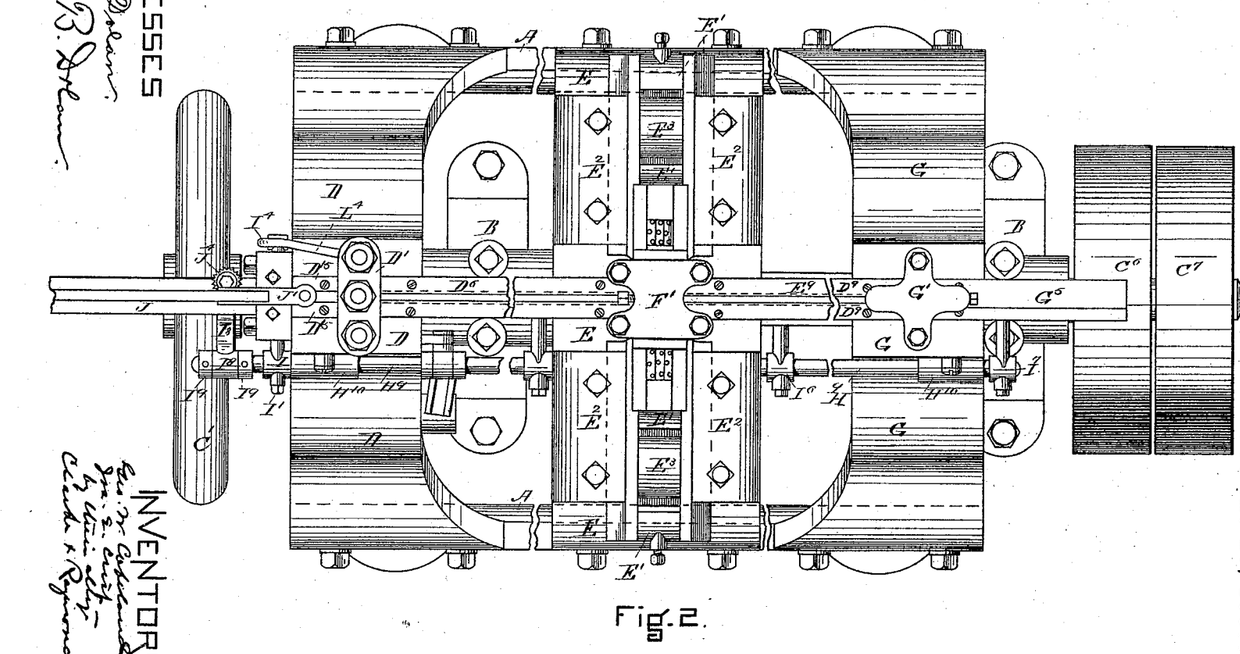
Fig. 2 is a plan view thereof.

The magazine J (see Figs. 1, 2, and 4) comprises a box of proper size to receive one hundred or more tack plates or blanks, and it is attached to the stand D. At the lower front corner of this magazine there is formed an opening of sufficient size to permit one tack blank or plate to rest on the bottom of the magazine and to pass through, and it is, in fact, the beginning of the feedway of the machine. To advance or feed the blanks or plates from the magazine automatically, I have arranged near the front end of the box a serrated or notched delivery-wheel, J⁴, arranged to extend the thickness of one plate or blank above the bottom of the magazine, and so that its teeth shall extend into it sufficiently far to mesh with or enter the serrations on the edge of the tack plate or blank. (See Fig. 9.) This wheel J⁴ is carried by a shaft, J⁵, being secured thereto by the nuts and washers J⁷, which form a frictional connection. This shaft J⁵ carries a ratchet-wheel, J⁶, which is moved or rotated with an intermittent movement by the reciprocating feed dog or pawl I⁸, carried and operated by the feed-rod H⁹. (See Fig. 9.) This feed dog or pawl is connected with the feed-rod H⁹ by the collars I⁹, and it has therefore only the reciprocating movement of the feed-rod H⁹ given it, the feed-rod being free to rotate or turn in the end of the feed dog or pawl. The end of the arm or pawl I⁸ extends through a slot under the magazine, and is supported by the under surface thereof, as represented in Fig. 4. It will be noticed that so long as one tack blank or plate is engaged with the feed-wheel J⁴, and until its rear end has passed into the feedway, the blank or plate above the magazine cannot drop down to engage the teeth of the feed-wheel; also, that the feed-wheel will not operate to feed the lowermost blank or plate immediately above it if it should accidentally engage it, if there is any obstruction, as it is only held to its shaft by sufficient friction to permit it to move a plate or blank when the feedway is open. The magazine-feed delivers the blanks or plates to the yielding feed-dog I², above described, and this feed-dog operates not only to receive the blanks or plates in successive order from the magazine and to advance them to the punching mechanism and to the feed-dogs in advance thereof, but it also adjusts the position of the head-forming portions of the blank or plate in relation to the punch and die, so as to always feed the blank or plate to the punching mechanism in such a manner as to bring the slots into right relative position to the head-forming projections of the blank or plate.

There is arranged in the feedway of the machine, to form the portion of its under surface at the point where the feed-dog I² engages the plate or blank, a section or stripper, I¹⁰, which serves to hold the plate or blank from being drawn downward by the dog I². Of course this must be sufficiently narrow to permit the jaws of the dog I² to move on each side of it.

Figure 11:
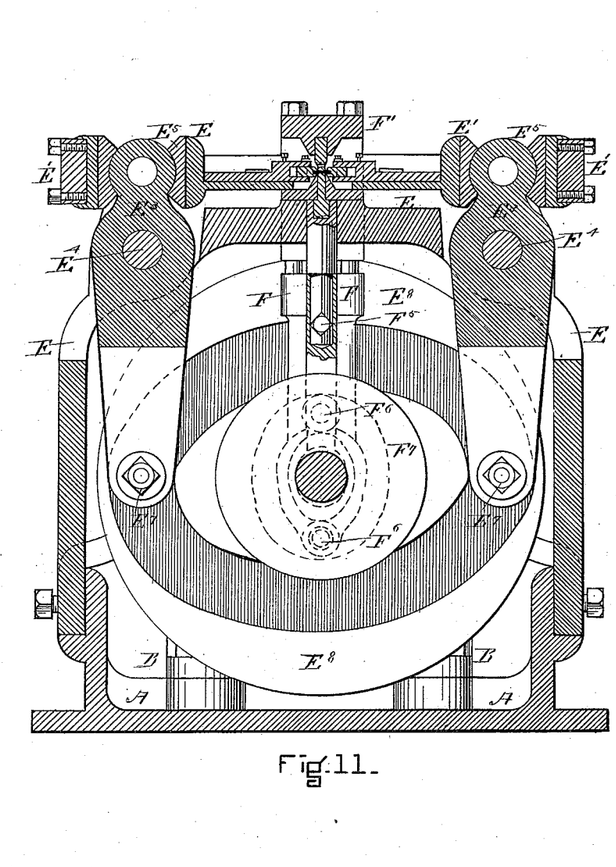
Fig. 11 is a view in cross vertical section to show the head centering or clamping tools and devices and their operating-cams and connecting mechanism.
Figure 12:
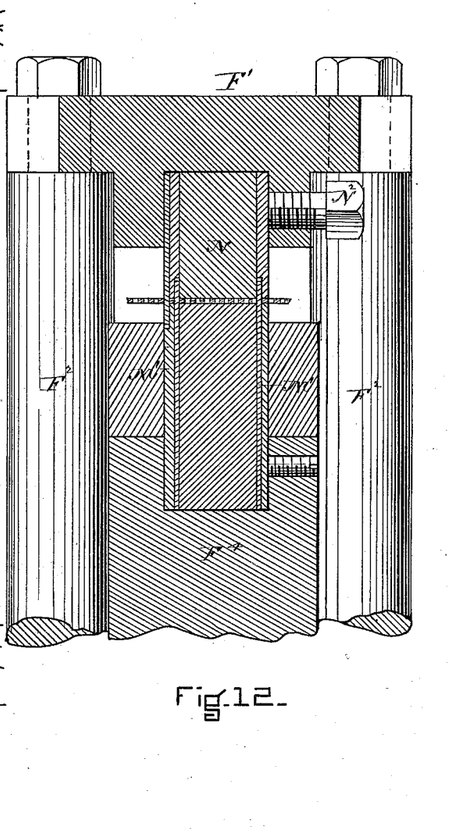
Fig. 12 is a vertical section, enlarged, through the blank-clamps at right angle to the line of the feeding device.

The magazine has a movable end, J², whereby its length may be adjusted to the length of the plates or blanks used, for it is necessary that the forward or front end of each blank or plate should be in a position to immediately enter the feedway to follow the preceding blank or plate without break. Between the forward end of the magazine and the die-holder there is placed a spring presser-foot, J⁹, which is held downward with sufficient pressure to hold the tack plate or blank in the feedway while it is being fed by the dog to the punch and die, so that it is properly guided through the feedway to them. While the presser-foot will permit this positive movement of the plate or blank it is held down by a spring sufficiently to cause it to hold a tack plate or blank stationary against the feeding action of the magazine-feed, when it happens that the magazine-feed has advanced it to that point without the feed-dog I² engaging it, so that it cannot be advanced beyond the presser-foot by the magazine-feed alone, and it is held thereby until the feed-dog $I^2$ positively engages it, as before explained. There is also arranged upon each side of the feedway at this point the guide pieces or plates $D^{15}$ $D^{15}$, which direct the forward end of the blanks or plates to the arch or passage in the die-holder K. The blank or plate, as the slots are punched therein, is moved forward or advanced by the action of the feed between the guide-plates $D^6$ $D^6$ to the centering, clamping, and heading devices arranged upon the stand E. The centering clamps or plates M N are formed as shown in Figs. 11 and 12, and they are adapted to be closed by the cross-head $F'$ $F^4$, the cross-head $F'$ being moved by connecting-rods $F^2$ and the cam-groove $F^7$ in the cam on the shaft C, and the cross-head $F^4$ by the rod or slide $F^5$, arranged to slide in the part F and driven by the said cam-groove $F^7$. The slides F and $F^5$ are each connected with the cam-groove by cam-pins $F^6$, pivoted in opposite parts of the cam, and so that its revolution causes the clamping-surfaces M and N to move simultaneously toward or from each other, according as the plate or blank is clamped or released. The heading-tools $O^2$ $O^3$ $O^4$ are substantially the same as those described in the application of Joseph E Crisp, above referred to, and there are two sets employed, one to operate upon each edge of the blank or plate. Each set comprises the tool $O^2$ for slightly splitting the head-forming projection, the tool $O^3$ for flattening to a certain extent each split section, and the tool $O^4$ for completing the formation of the head. They are each mounted upon a cross-head or slide, O, and are given simultaneous movements toward and from each other and the tack-plate by means of a cam-groove, $E^8$, on the shaft C and the levers $E^3$, which are pivoted at $E^4$. A feedway formed by the guide-plates $E^9$ extends from the heading devices to the shears or severing devices, which are mounted upon the stand G, and there is placed in the feedway a yielding elevating device, $E^{10}$, which serves to lift the plates or blanks as they move or are fed to the final operation, for the purpose hereinafter indicated.

Figures 13, 17, 18, 20, 21, 22:
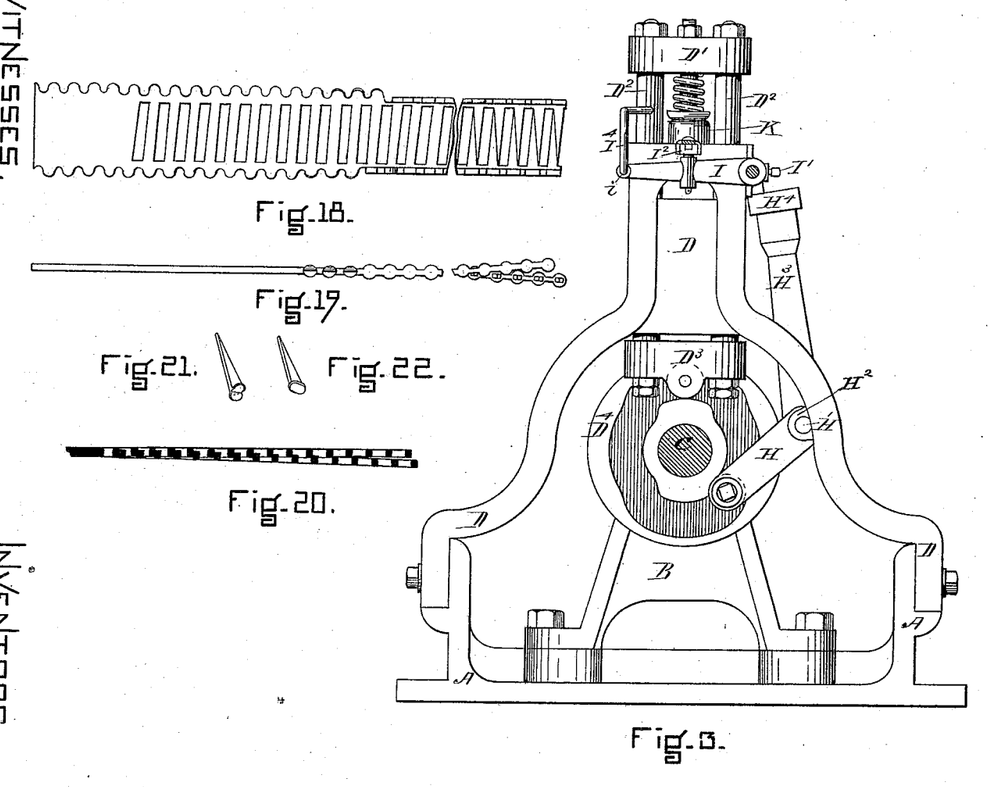
Fig. 13 is a view in vertical section, enlarged, representing the position of the blank-heading tools in relation to the blank-clamps.
Fig. 17 is a cross vertical section through the stand carrying the shears.
Fig. 18 represents the various operations of the machine upon a blank.
Fig. 20 is a view in section, illustrating the operation of the devices for severing the blank into two complete tack-strips.
Fig. 21 is a view in perspective of a section of the blank, representing one step in the process of forming the head.
Fig. 22 is also a perspective view of a portion of a blank-strip, showing the complete head.
Figures 13, 14, 15:
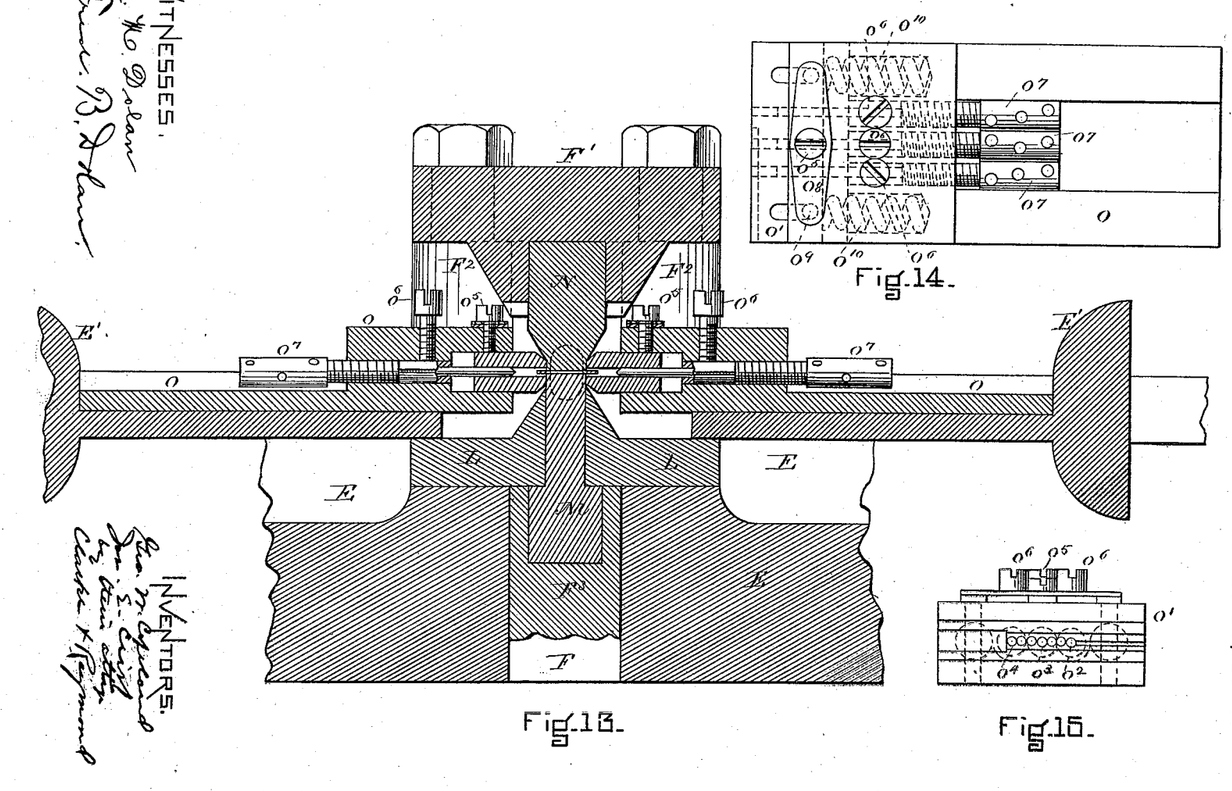
Fig. 14 is a plan view showing one group of heading-tools and the reciprocating head to which they are secured.
Fig. 15 represents in elevation the ends of the heading-tools and the relation which they bear to each other, to the block supporting them, and to the feedway.
Figure 16:
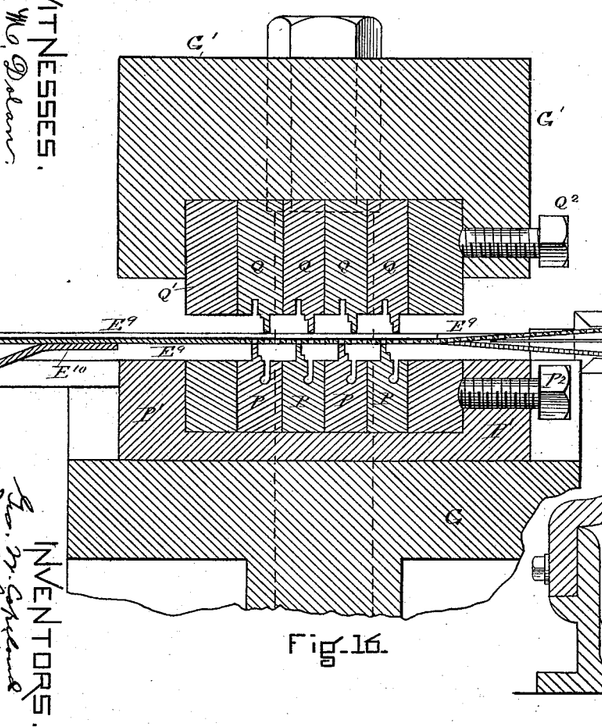
Fig. 16 is a view in vertical section, enlarged, of the shears or devices for separating the blank into two strips.
Figure 17:
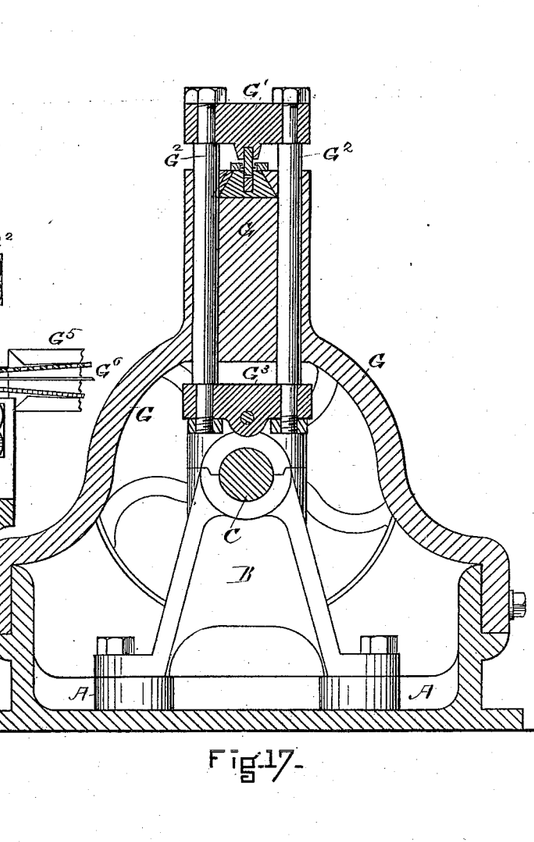
Figure 23:
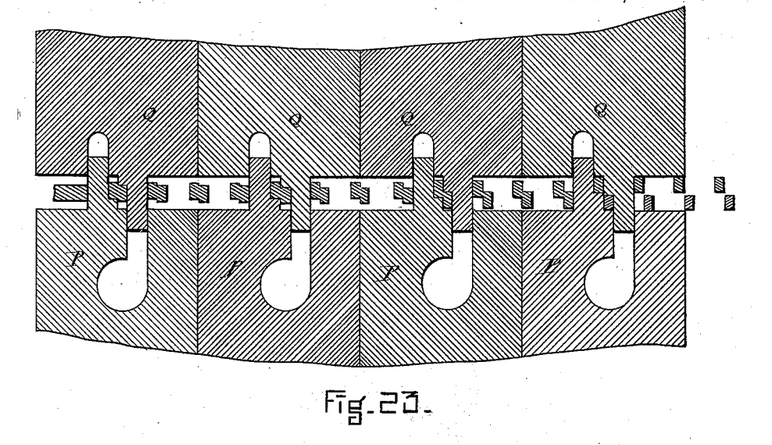
Fig. 23 is an enlarged view in longitudinal section to represent the position which the two groups of shears bear to each other and to the nail plate or blank in their operation of dividing it into two strips.
Figure 24:
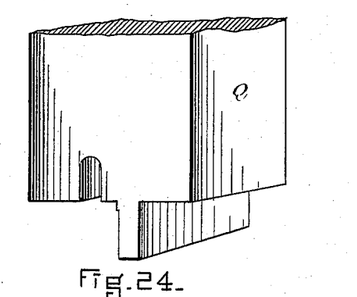
Fig. 24 is a view in perspective of one of the upper group of shears.
Figure 25:
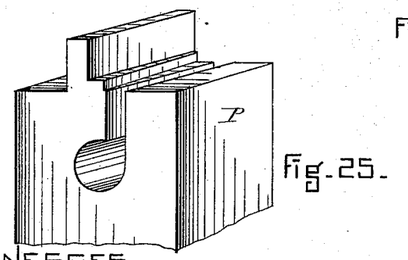
Fig. 25 is a view in perspective of one of the lower group of shears.
Figure 26:
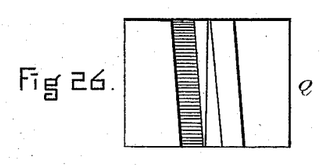
Fig. 26 is a plan view of one of the upper group of shears inverted.
Figure 27:
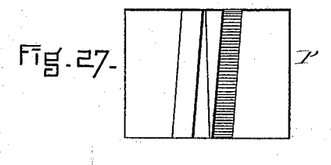
Fig. 27 is a plan view of one of the lower group of shears.

The shearing devices or cutters I have represented as embodied in two gangs or groups—the upper gang, Q, and the lower gang, P—and they are arranged to cut or sever by a diagonal cut the sections of the plate or blank between the punch-slots therein to form the shanks of the tack-strip. This cut extends from the corner end of one slot diagonally to the corner end of the next adjacent slot. (See Fig. 18.) The shears are arranged so that the first set serve to partially sever this shank-forming section of the plate or blank, the second set increases this cut, the third set increases to a still further extent the shearing operation, and the fourth set completes the shearing action; but of course the four sets are simultaneously operating, so that at each reciprocation of the heads carrying the shears one complete cut across the blank or plate is made. The reason for forming the cut by the successive action of a gang of cutters is that it corrects any variation in the pitch of the strip; second, that it prevents abrupt or severe strain upon the blank or plate, which may tend to weaken the connecting-webs of the strip; third, the wear and strain upon the shears is lessened; fourth, we are enabled to use the last set of shears additionally as devices for straightening the strips. The lower group, P, of the shears are held by a box or form, $P'$, fixed in the stand G, as shown in Figs. 16 and 17, and a set-screw serves to bind together in this box or form the lower parts of these shears. Each shear comprises a blade that is adapted to enter a slot in the tack blank or plate and a recess for receiving the blade of the opposite shear. Each also has a cutting-edge and a face between the blade and slot of the same shape as the shank of the tack it is intended to form. The cutting-edges of the shears vary in position, the first set being the lowest or farthest removed from each other, the second being somewhat nearer the ends of the blades, the third being still nearer, and the fourth being farthest out. This makes the first blades the longest in the series and the last blades the shortest. The lower set, P, of shears are stationary. The upper set, Q, are provided with a reciprocating movement by mechanism hereinafter described. It follows from this description of the construction that upon the feed of the headed plate or blank to the shears on the downward movement of the upper gang the blades of the upper set enter the slots in the blank or plate, and their cutting-edges come in contact with the upper surface thereof and move the plate or blank downward, causing the blades of the lower set to enter their respective slots and the tack plate or blank to be moved downward until its cutting-edges come in contact with the shears. As the cutting-edges are so placed as to gradually increase the depth of the cut, it follows that the first set of shears will make hardly more than a mark or a line upon both sides of the metal, the second set will deepen these cuts, the third set almost, but not quite, severs it, and the fourth completes the operation of the device and completely separates the metal into two tack-blanks. It will also be seen that each blade of each set of shears enters the hole in its opposite shear before the cutting-edges come in contact with the surface of the metal to cut it, so that the shears are supported at their outer ends during their cutting action. It will be seen, also, that the blade-receiving holes of the lower shears extend to waste-holes, which are adapted to receive dust and other matter falling into the recess.

It is obvious that the tack plate or blank must be removed from the blades of the lower shears before it can be fed. This is accomplished by making the blades of the upper shears, which are otherwise the same as the lower, about twice as long as the lower, and by causing them to fit the slots they are intended to enter a little tighter, so that the first motion of the cross-head draws the blank off the lower blades. The upper blades are removed from the blank by providing the guiding-plates $D^9$ with extensions which project over the side edges of the blank or plate, to thereby serve to hold the blank or plate from being moved upward while the blades are being withdrawn. The blank or plate elevating or lifting spring $A^{10}$ assists somewhat in holding the blank or plate up over the lower shear while it is being fed slowly forward; but it may be dispensed with when the machine is running at speed. Beyond the shears there is arranged a guideway, $G^5$, which is separated into two parts by the spring-plate $G^6$. This spring-plate extends toward the severing mechanism and serves to keep the two tack-strips, as they are made, separated from each other, so that one is caused to pass over it and the other beneath it, as represented in Fig. 16. The cross-head $G'$ is reciprocated by the cam-groove in the cam-disk upon the shaft C and lower crosshead, $G^3$, which has a cam pin entering the cam-groove of the said cam, and the slide-rods $G^2$.

To operate the machine the magazine is filled with prepared blanks or plates—that is, blanks or plates having notched edges—and the end $J^2$ adjusted so that the blanks have no longitudinal movement. Upon the starting of the machine the magazine-feed advances the lowermost blank with an intermittent movement, and upon the forward end of the strip coming over the feed-dog $I^2$ it is engaged thereby and fed forward under the presser to the punching mechanism, which forms diagonal slots across the same, and to a feed-dog adapted to enter a slot thus formed and engage the blank and assist in feeding it onward with an intermittent movement to the heading devices, where the plate or blank is firmly clamped and centered between the two jaws or clamping-surfaces, and while thus held is subjected to the action of the heading devices, which are simultaneously moved against each edge of the plate or blank to operate upon the head-forming projections thereof, as above indicated. Upon the withdrawl of the heading devices and release by the clamp, the plate or blank is advanced, as before, another feed-dog entering a slot in advance of the heading devices and feeding the strip to the severing mechanism, which operates to cut the plate or blank into two complete tack-strips; and the movement of the blanks from the magazine is practically continuous, so that the machine is simultaneously operated on one or more strips, punching one section thereof, heading another, and separating it into two complete tack-strips.

We would not be understood as limiting ourselves to the especial details of construction herein specified. For instance, in lieu of a gang of heading tools or devices there may be used heading implements or tools which will form the head at one operation, and instead of the multiple shear there may be used a single one. As many of the auxiliary feed-dogs for feeding the tack plate or blank may be used as desired. The clamps and centering-plates M N may have spacing plates or extensions arranged to enter the slots of the tack plate or blank when the clamps are closed thereon, to assist in preventing the plate or blank from being extended longitudinally during the heading operation.

The machine, or certain parts of it, may be used for making tack-strips from a blank such as is described in Letters Patent No. 336,539, dated February 16, 1886. It is obvious that the punching mechanism would be unnecessary if such a blank were used. We would also say that blanks can be punched or provided with cross-slots before they are placed in the magazine, in which case of course they would be fed from the magazine directly to the heading mechanism.

It will be seen that the shears or each section thereof, comprising the upper and under shear, act upon the shank-forming part of the tack plate or blank while it is held confined, as it were, in a box—that is, confined, so far as its side edges, top, and bottom are concerned, by the sides of the tongues of the shears and by the surfaces of the dies.

Having thus fully described our invention, we claim and desire to secure by Letters Patent of the United States—

1. The combination, in a tack-strip-making machine, of a punching device for forming slots in a tack plate or blank, a heading mechanism for forming heads upon the edges of said blank, and shears for separating the headed blank or plate into two complete strips, substantially as described.

2. The combination, in a tack-strip-making machine, of a punching device for forming slots in a tack plate or blank, a heading mechanism for forming heads upon the edges of said blank, and shears for separating the headed blanks or plates into two complete tack-strips, and appropriate feeding mechanism for advancing the strip with an intermittent movement from one set of devices to another, substantially as described.

3. The combination, in a tack-strip-making machine, of an automatic feeding mechanism for feeding tack plates or blanks automatically and in successive order to the tack-strip-making devices, a reciprocating punch for forming slots in said plate or blank, heading mechanism or devices arranged to be simultaneously operated upon each edge of the plate or blank, severing or shearing mechanism for dividing the plate or blank into two complete strips, and an intermittent feed for advancing the plate or blank from the punching mechanism to the heading and severing devices, substantially as described.

4. The combination, in a tack-strip-making machine, of a feedway, an intermittent feed, and two head-forming devices adapted to be simultaneously operated to produce or form heads upon each edge of the plate or blank, substantially as described.

5. In a tack-strip-making machine, the combination of a feedway with a tack-heading device arranged upon each edge of the feedway and adapted to be operated to form heads upon each edge of a tack-plate, substantially as described.

6. The combination, in a tack-strip-making machine, of a feedway along which the tack-strip is fed, mechanism for moving the tack-strip with a forward intermittent movement, and a shearing or severing device for severing a blank or plate into two strips by a diagonal cut, comprising two shears, each of which has a tongue and shearing surface or edge at the side of the tongue and a tongue-receiving recess, arranged in relation to each other and the feedway as specified, all as described.

7. The combination, in a tack-strip-making machine, of a feedway, an intermittent feed, the shearing devices for cutting the blank or plate into two strips, and a separator-plate for holding the tack-strips separated as they leave the shears, substantially as described.

8. The combination, in a tack-strip-making machine, of a feedway, an intermittent feed, and the two gangs or groups of shearing devices P Q, substantially as described.

9. The combination, in a tack-strip-making machine, of the feedway, an intermittent feed, a tack blank or plate clamp, and two heading devices arranged to be operated upon each edge of the tack-strip while held by the clamp, substantially as described.

10. In a tack-strip-making machine, the feed-dog $I^2$, having teeth, as described, and provided with four-motion feed-movements, substantially as described.

11. The combination of the magazine for holding a number of tack-plates with a feed-wheel having teeth or projections adapted to enter notches formed upon the edge of the tack-plates, and which teeth enter the magazine-space from one side thereof, with mechanism for providing the wheel with an intermittent rotation, substantially as described.

12. In a tack-strip-making machine, the feed-wheel $J^4$, having an intermittent movement and secured to its shaft in a manner to permit the movement of the shaft therein when it is required to prevent the feed of a blank or plate, substantially as described.

13. The combination of the dog $I^2$, the feedway of the machine, and the stripper $I^{10}$, substantially as described.

14. The combination of the feedway of the machine, an intermittent feed, and the presser-foot $J^9$, substantially as described.

15. The combination of the magazine for holding plates or blanks in stack, a feed-wheel, as specified, for advancing them in continuous order therefrom, and a secondary feed, of the character indicated, for engaging the blanks after they have left the magazine and for presenting them to the punching mechanism, with said punching mechanism, substantially as described.

16. The combination of the feedway of the machine, the intermittent feed, the tack-blank die and punch, the cross head supporting the same, and a cam for providing it with alternate periods of rest and movement, substantially as described.

17. The combination, in a tack-strip-making machine, of an intermittent feed, the slides $E'$, the heading tool or tools carried thereby, a cam, and the connecting-levers $E^3$, substantially as described.

18. The combination of the feedway of the machine, the clamps M N, a cam, and connecting devices, substantially as specified, for moving them at stated intervals toward and from each other and holding them closed and open, substantially as described.

19. The combination of the feedway of the machine, the clamps M N, a cam, constructed substantially as specified, to move the clamps to open and close them and to hold them stationary while open and while closed, and devices, substantially as described, for connecting the cam with the said clamps M N, all as set forth.

20. The combination of the rod $H^9$ and mechanism for providing it with alternate periods of motion and rest, comprising the oscillating lever $H^3$, a cam for operating it, and the adjustable block $H^4$, having a cross-slot formed therein, and an arm connecting said rod $H^9$ with said cross-slot, substantially as described.

21. The combination of the feed-rod $H^9$, having reciprocating movements, substantially as specified, with the lever I, the slide $D^2$, the connection $I^4$, and feed-dogs carried or operated by said rod $H^9$, substantially as described.

22. The combination, in a tack-strip-making machine, of the following instrumentalities: first, the magazine for holding tack plates or blanks in stack and a feed for advancing them in successive order therefrom; second, the feedway of the machine, adapted to connect the magazine with punching devices, heading mechanism, and shears, and an intermittent feed operated therein for advancing plates or blanks with an intermittent movement to the said devices; third, a reciprocating punch for forming diagonal slots in the blank or plate, intermittingly operated; fourth, heading devices for simultaneously forming heads upon each edge of the plate or blank and clamps for holding the blank during the operation of the said head-forming devices; fifth, separating devices for separating the blank or plate into two complete tack-strips; sixth, the main shaft C and cams thereon for operating the shears, the clamps, the heading devices, the punch, and the feed, and providing them with the alternate periods of movement and rest specified, substantially as described.

23. The shearing devices comprising a gang of shears, Q, each of which has a tongue, a shearing surface or edge, and a recess, with a gang of shears, P, also having tongues, shearing edges or surfaces, and recesses, all substantially as and for the purposes described.

24. The shearing device comprising a gang, Q, of shears having shearing edges or surfaces arranged upon different levels, in combination with a gang, P, of shears having shearing-edges arranged upon different levels, adapted to co-operate with the first-named, substantially as specified, and for the purposes described.

25. The gang, Q, of shears having shearing edges or surfaces, tongue-recesses, and tongues shorter than the tongues of their opposing shears, substantially as described.

26. A pair of shears each having a tongue and shearing surface or edge at the side of the tongue and a recess, adapted for conjoint operation, substantially as described.

27. The combination of the feedway of the machine, the stationary group, P, of shears having tongue-recesses, shearing edges or surfaces, and tongues, with a reciprocating gang, Q, of shears having tongues longer than the tongues of the stationary group, shearing surfaces or edges, and recesses, substantially as described.

GEO. W. COPELAND.
JOS. E. CRISP.

Witnesses:
F. F. RAYMOND, 2d,
FRED. B. DOLAN.